T. S. SMITH.
Corn Husker.

No. 100,941.  Patented March 15, 1870.

Witnesses:
C. L. Fisher
H. D. Peck

Inventor.
Thos. S. Smith

UNITED STATES PATENT OFFICE.

THOMAS S. SMITH, OF CINCINNATI, ASSIGNOR TO HIMSELF AND O. H. P. ANDERSON, OF SALEM, OHIO.

IMPROVEMENT IN CORN-HUSKERS.

Specification forming part of Letters Patent No. 100,941, dated March 15, 1870.

*To all whom it may concern:*

Be it known that I, T. S. SMITH, of Cincinnati, in the county of Hamilton and State of Ohio, have invented a new and useful Improvement in Corn Huskers, of which the following is a specification.

My invention relates to an endless apron for feeding the corn upon the stock, after it is cut in the field, to the rollers located one above the other, and to a pair of husking-rollers, and to the screw-brushes for feeding and brushing the ears of corn in the conveyer; also, to a rotary cutter to the rear of the husking-rollers.

Figure 1:
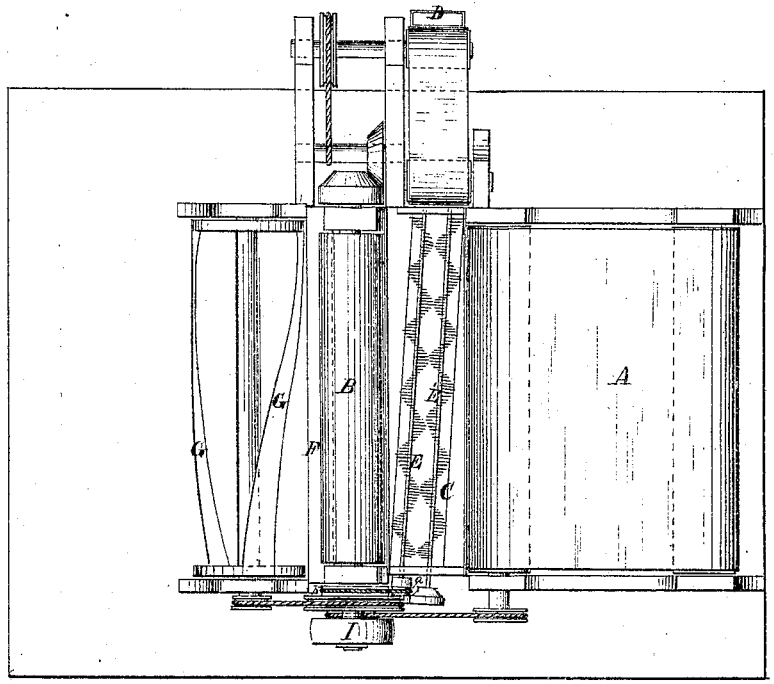
Figure 2:
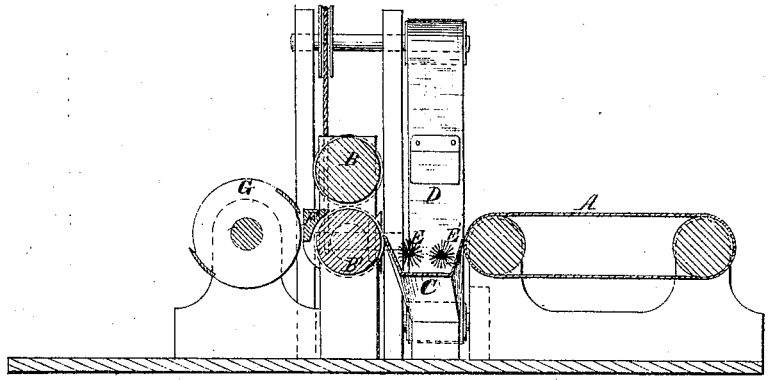

Figure 1 is a plan of my improved corn-husker. Fig. 2 is a longitudinal sectional elevation of the same.

A is the endless apron which conveys the corn in the husk to the rollers B B'. These rollers are journaled in a suitable frame, one above the other.

C is a conveyer located between the endless apron and the rollers. It inclines down toward the elevator D, which carries the husked corn to a designated receptacle.

Near the bottom of the conveyer are located two screw-brushes, E E'. The brush E has motion imparted to it by means of a belt, $a$, connecting it with a large pulley, $b$, on the shaft of the upper roller, B. The second brush, E', is caused to revolve slower than the brush E by suitable gearing connecting the two brushes. A table, F, to the rear of and close to the face of the lower roller, B', is for the purpose of presenting a square edge next to the revolving cutter G.

I is the driving-pulley on the shaft of the upper roller.

The operation of husking corn may be carried on in the field or in the building where the corn is to be stored. In the former case the machine will be constructed upon wheels and drawn by horses. A cutter may be applied to the front of the husker, which shall cut the cornstalk close to the ground. The corn is then passed by the endless apron to the rollers, which, rotating in opposite directions, draw the cornstalk in between them. When the husk, with the inclosed ear of corn, comes in contact with the rollers, the ear of corn is broken from the stalk and drops into the conveyer, while the stalk and husk pass through the rollers, and, being crushed in their passage, are easily chopped into feed by the rotating knives, which rotate close to the edge of the table F. The corn as it leaves the rollers has more or less "silk" and dust adhering to it. These are brushed off by the long rotating brushes near the bottom of the conveyer. One of the said brushes has a slow motion, the other a faster rotation, that the ears of corn may be cleaned at the same time they are moved forward to the elevator, which conveys them to the designated receptacle or to the hopper of a corn-sheller.

If the corn to be husked is destined for stock-feeding, the screw-brushes E E' may be removed; and should there be no object in making feed of the stalks and husks, the rotating knives may be dispensed with.

The cornstalk may be fed by hand or otherwise to the rollers, and where power is not attainable the machine may be run by hand.

I claim as my invention—

The combination and arrangement of the revolving cutters G G, rollers B B', table F, spiral brushes E E', endless apron A, and elevator D, when all these parts are constructed and arranged to operate in the manner and for the purpose herein set forth.

THOS. S. SMITH.

Witnesses:
   H. D. PECK,
   C. L. FISHER.